United States Patent
Park et al.

(10) Patent No.: US 11,277,038 B2
(45) Date of Patent: Mar. 15, 2022

(54) APPARATUS AND METHOD FOR RF BEAMFORMING WIRELESS POWER TRANSMISSION BASED ON TDD COMMUNICATION

(71) Applicant: KOREA ELECTRONICS TECHNOLOGY INSTITUTE, Seongnam-si (KR)

(72) Inventors: Yongju Park, Goyang-si (KR); Yongseong Kim, Goyang-si (KR); Yongseok Lim, Seoul (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 164 days.

(21) Appl. No.: 16/713,035

(22) Filed: Dec. 13, 2019

(65) Prior Publication Data
US 2021/0057940 A1 Feb. 25, 2021

(30) Foreign Application Priority Data
Aug. 21, 2019 (KR) .................. 10-2019-0102644

(51) Int. Cl.
*H02J 50/80* (2016.01)
*H02J 50/50* (2016.01)

(52) U.S. Cl.
CPC .............. *H02J 50/80* (2016.02); *H02J 50/50* (2016.02)

(58) Field of Classification Search
CPC .. H02J 50/20; H02J 50/23; H02J 50/27; H02J 50/50; H02J 50/80; H04B 7/00
See application file for complete search history.

(56) References Cited

U.S. PATENT DOCUMENTS

2006/0199620 A1* 9/2006 Greene .................. H02J 7/025
455/572
2013/0322558 A1* 12/2013 Harel .................. H04B 7/0634
375/267
(Continued)

FOREIGN PATENT DOCUMENTS

KR 10-2014-0017755 A 2/2014
KR 10-2014-0017758 A 2/2014
(Continued)

OTHER PUBLICATIONS

[Supportive Materials for Exception to Loss of Novelty] Yongju Park et al., Time Division Duplex(TDD) Communication Technology for Controlling Radio Frequency(RF) Beam-Forming Wireless Power Transmission, Jun. 18, 2019, Telecommunications Technology Association, Republic of Korea, with English Preface.
(Continued)

Primary Examiner — Hal Kaplan
Assistant Examiner — Joseph N Inge
(74) Attorney, Agent, or Firm — Hauptman Ham, LLP (57) ABSTRACT

A power transmitting unit (PTU) for wireless power transmission (WPT) includes a communication transceiver and a power controller. The communication transceiver connects a communication link with at least one power receiving unit (PRU) through legacy communication and exchanges parameters necessary for the WPT through the connected communication link. The power controller is configured to transmit, to the PRU, a PTU beacon containing information about a dedicated power slot (DPS) allocated to the PRU in a super frame including a plurality of DPSs, to receive a PRU beacon from the PRU, to extract a phase difference between a plurality of antennas by analyzing a continuous wave (CW) of the PRU beacon, and to transmit power to the
(Continued)

PRU in the allocated DPS in consideration of the phase difference.

8 Claims, 4 Drawing Sheets

(56) References Cited

U.S. PATENT DOCUMENTS

| | | | | |
|---|---|---|---|---|
| 2015/0194838 A1* | 7/2015 | Won | ........................ | H02J 7/025 |
| | | | | 320/108 |
| 2016/0156232 A1* | 6/2016 | Joye | ..................... | H04B 5/0037 |
| | | | | 307/104 |
| 2018/0205256 A1* | 7/2018 | Kwon | ..................... | H02J 50/12 |
| 2018/0337534 A1* | 11/2018 | Bell | ....................... | H02J 50/402 |

FOREIGN PATENT DOCUMENTS

| | | |
|---|---|---|
| KR | 10-2014-0017760 A | 2/2014 |
| KR | 10-2018-0103424 A | 9/2018 |

OTHER PUBLICATIONS

Korean Office Action dated Jun. 9, 2021, in connection with the Korean Patent Application No. 10-2019-0102644.
Notice of Allowance dated Nov. 4, 2021, for corresponding Korean Patent Application No. KR10-2019 0102644 with an English translation.

* cited by examiner

APPARATUS AND METHOD FOR RF BEAMFORMING WIRELESS POWER TRANSMISSION BASED ON TDD COMMUNICATION

TECHNICAL FIELD

The present disclosure relates in general to wireless power transmission (WPT) technology and, more particularly, to an apparatus and method for radio frequency (RF) beamforming WPT based on time division duplex (TDD) communication.

BACKGROUND

Wireless power transmission (WPT) mainly includes non-radiative techniques using electromagnetic induction or magnetic resonance and radiative techniques using a radio frequency (RF) beam. In the non-radiative techniques, power is transferred over short distances by magnetic fields using inductive coupling between coils of wire or by electric fields using capacitive coupling between metal electrodes. In the radiative techniques, power is transferred by beams of electromagnetic radiation.

Among the radiative techniques, RF wireless power transmission (RF WPT) refers to a technique of wirelessly transmitting electric power through radio waves. The RF WPT technique not only achieves longer range transmission, but also allows omnidirectional transmission to several receiver devices. However, power efficiency is very low.

SUMMARY

The present disclosure provides an apparatus and method for controlling radio frequency (RF) beamforming wireless power transmission (WPT) based on time division duplex (TDD) communication.

According to embodiments of the present disclosure, a power transmitting unit (PTU) for wireless power transmission (WPT) includes a communication transceiver connecting a communication link with at least one power receiving unit (PRU) through legacy communication and exchanging parameters necessary for the WPT through the connected communication link; and a power controller configured to transmit, to the PRU, a PTU beacon containing information about a dedicated power slot (DPS) allocated to the PRU in a super frame including a plurality of DPSs, to receive a PRU beacon from the PRU, to extract a phase difference between a plurality of antennas by analyzing a continuous wave (CW) of the PRU beacon, and to transmit power to the PRU in the allocated DPS in consideration of the phase difference.

In the PTU, transmitting the PTU beacon, receiving the PRU beacon, and transmitting the power may be performed through a frequency region adjacent to a guard band in an industrial scientific medical (ISM) band, and the adjacent frequency region may occupy a predetermined band from each of a start frequency and an end frequency of the ISM band.

The super frame may be defined as a signal period from transmission of one PTU beacon to transmission of a next PTU beacon, and the super frame may contain $2^{SO}$ DPSs according to a slot order (SO) value for defining a length of a field in a system. A first DPS of $2^{SO}$ DPSs may be used for PTU beacon transmission, and a second DPS to a $2^{SO}$th DPS of $2^{SO}$ DPSs may be used for PRU beacon transmission and power transmission.

According to embodiments of the present disclosure, a power receiving unit (PRU) for wireless power transmission (WPT) includes a communication transceiver connecting a communication link with a power transmitting unit (PTU) through legacy communication and exchanging parameters necessary for the WPT through the connected communication link; and a power controller configured to receive, from the PTU, a PTU beacon containing information about a dedicated power slot (DPS) allocated to the PRU in a super frame including a plurality of DPSs, to transmit a PRU beacon to the PTU in the allocated DPS, and to receive power from the PTU in the allocated DPS.

In the PRU, receiving the PTU beacon, transmitting the PRU beacon, and receiving the power may be performed through a frequency region adjacent to a guard band in an industrial scientific medical (ISM) band, and the adjacent frequency region may occupy a predetermined band from each of a start frequency and an end frequency of the ISM band.

The super frame may be defined as a signal period from transmission of one PTU beacon to transmission of a next PTU beacon, and the super frame may contain $2^{SO}$ DPSs according to a slot order (SO) value for defining a length of a field in a system. A first DPS of $2^{SO}$ DPSs may be used for PTU beacon transmission, and a second DPS to a $2^{SO}$th DPS of $2^{SO}$ DPSs may be used for PRU beacon transmission and power transmission.

According to embodiments of the present disclosure, a method for controlling wireless power transmission (WPT) at a power transmitting unit (PTU) includes, at a communication transceiver, connecting a communication link with at least one power receiving unit (PRU) through legacy communication; at the communication transceiver, exchanging parameters necessary for the WPT through the connected communication link; at a power controller, transmitting, to the PRU, a PTU beacon containing information about a dedicated power slot (DPS) allocated to the PRU in a super frame including a plurality of DPSs; at the power controller, receiving a PRU beacon from the PRU; at the power controller, extracting a phase difference between a plurality of antennas by analyzing a continuous wave (CW) of the PRU beacon; and at the power controller, transmitting power to the PRU in the allocated DPS in consideration of the phase difference.

In the method, transmitting the PTU beacon, receiving the PRU beacon, and transmitting the power may be performed through a frequency region adjacent to a guard band in an industrial scientific medical (ISM) band, and the adjacent frequency region may occupy a predetermined band from each of a start frequency and an end frequency of the ISM band.

The super frame may be defined as a signal period from transmission of one PTU beacon to transmission of a next PTU beacon, and the super frame may contain $2^{SO}$ DPSs according to a slot order (SO) value for defining a length of a field in a system. A first DPS of $2^{SO}$ DPSs may be used for PTU beacon transmission, and a second DPS to a $2^{SO}$th DPS of $2^{SO}$ DPSs may be used for PRU beacon transmission and power transmission.

According to embodiments of the present disclosure, a method for controlling wireless power transmission (WPT) at a power receiving unit (PRU) includes, at a communication transceiver, connecting a communication link with a power transmitting unit (PTU) through legacy communication; at the communication transceiver, exchanging parameters necessary for the WPT through the connected communication link; at a power controller, receiving, from the PTU, a PTU beacon containing information about a dedicated power slot (DPS) allocated to the PRU in a super frame including a plurality of DPSs; at the power controller, transmitting a PRU beacon to the PTU in the allocated DPS; and at the power controller, receiving power from the PTU in the allocated DPS.

In the method, receiving the PTU beacon, transmitting the PRU beacon, and receiving the power may be performed through a frequency region adjacent to a guard band in an industrial scientific medical (ISM) band, and the adjacent frequency region may occupy a predetermined band from each of a start frequency and an end frequency of the ISM band.

The super frame may be defined as a signal period from transmission of one PTU beacon to transmission of a next PTU beacon, and the super frame may contain $2^{SO}$ DPSs according to a slot order (SO) value for defining a length of a field in a system. A first DPS of $2^{SO}$ DPSs may be used for PTU beacon transmission, and a second DPS to a $2^{SO}$th DPS of $2^{SO}$ DPSs may be used for PRU beacon transmission and power transmission.

According to the present disclosure, performing the WPT through RF beamforming can overcome very low power efficiency of typical RF WPT technique. In particular, each antenna of an antenna array forms a directional beam pattern and thereby transmits power only to a focused target. This transmission scheme can increase power transmission efficiency.

DETAILED DESCRIPTION

Hereinafter, embodiments of the present disclosure will be described in detail with reference to the accompanying drawings. The present disclosure may, however, be embodied in many different forms and should not be construed as being limited to the embodiments set forth herein. Rather, these embodiments are provided so that the disclosure will be thorough and complete and will fully convey the scope of the disclosure to those skilled in the art.

In the following description of embodiments, techniques that are well known in the art and not directly related to the present disclosure are not described. This is to clearly convey the subject matter of the present disclosure by omitting an unnecessary explanation. For the same reason, some elements in the drawings are exaggerated, omitted, or schematically illustrated. Also, the size of each element does not entirely reflect the actual size. In the disclosure, the same or corresponding elements are denoted by the same reference numerals.

Figure 1:
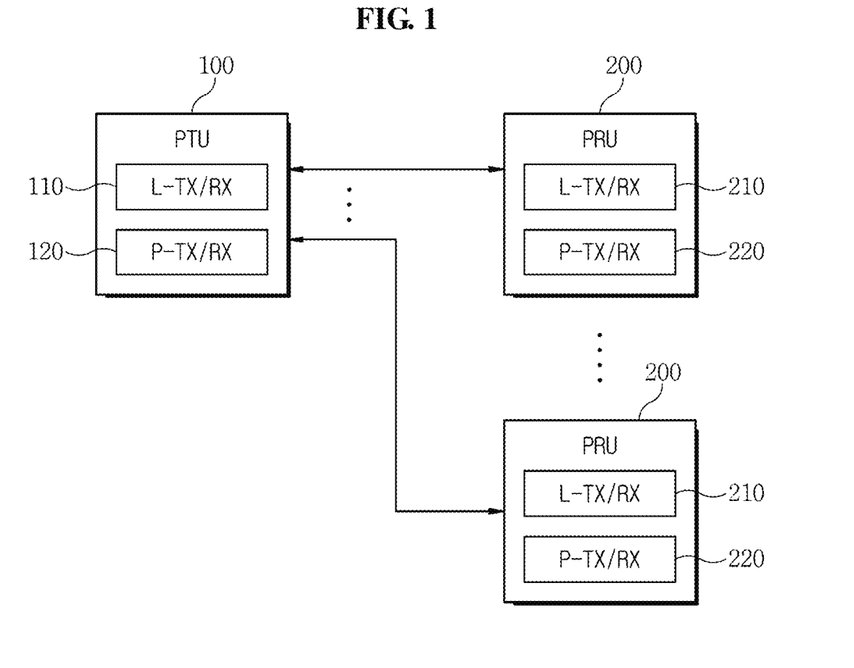
FIG. 1 is a block diagram illustrating an RF beamforming WPT system based on TDD communication according to an embodiment of the present disclosure.

Wireless power transmission (WPT) according to embodiments of the present disclosure is made through radio frequency (RF) beamforming and is controlled based on time division duplex (TDD) communication. At the outset, a WPT system according to an embodiment of the present disclosure will be described. FIG. 1 is a block diagram illustrating an RF beamforming WPT system based on TDD communication according to an embodiment of the present disclosure.

Referring to FIG. 1, the WPT system according to an embodiment includes a power transmitting unit (PTU) 100 and at least one power receiving unit (PRU) 200. The PTU 100 is an apparatus that wirelessly transmits power to the PRU 200, and the PRU 200 is an apparatus that wirelessly receives power from the PTU 100. That is, the PRU 200 is charged through WPT.

The PTU 100 includes a communication transceiver 110 (also referred to as L-TX/RX) and a power controller 120 (also referred to as P-TX/RX). The communication transceiver 110 is a component for communicating with the PRU 200 through legacy communication. The power controller 120 transmits a PTU beacon to the PRU 200 and receives a PRU beacon from the PRU 200. Also, the power controller 120 wirelessly transmits power to the PRU 200. In particular, the power controller 120 includes an antenna array composed of a plurality of antennas. Each antenna forms a directional beam pattern having a specific angle by using constructive or destructive interference between signals and transmits power only to one corresponding PRU 200 in a time resource allocated only to the corresponding PRU 200, that is, in a dedicated power slot (DPS). This transmission scheme can increase power transmission efficiency.

The PRU 200 includes a communication transceiver 210 (also referred to as L-TX/RX) and a power controller 220 (also referred to as P-TX/RX). The communication transceiver 210 is a component for communicating with the PTU 100 through legacy communication. The power controller 220 transmits the PRU beacon to the PTU 100 and receives the PTU beacon from the PTU 100. Also, the power controller 220 wirelessly receives power from the PTU 100.

Figure 2:
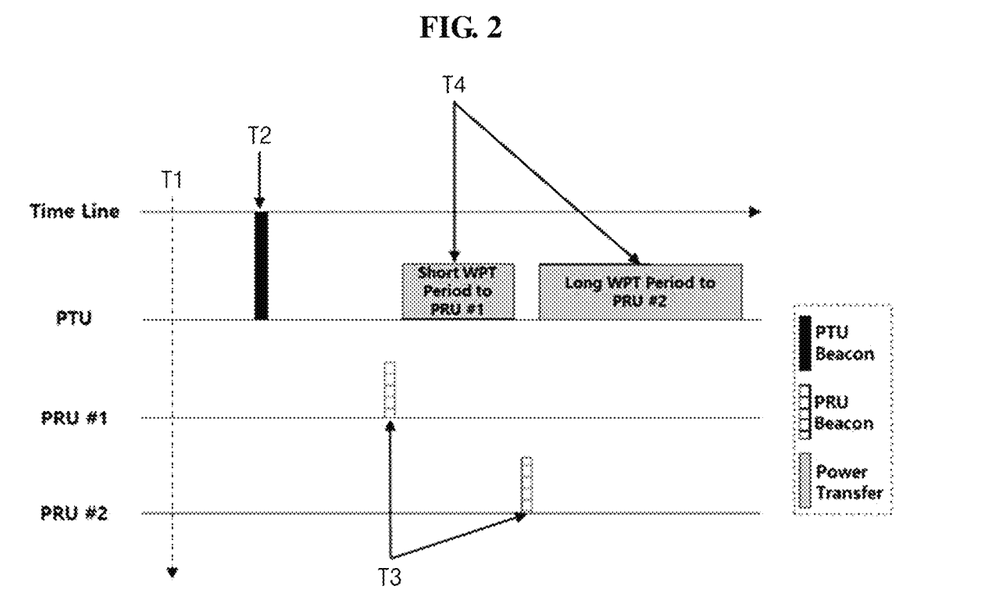
FIG. 2 is a diagram illustrating the timing for WPT according to an embodiment of the present disclosure.

Now, the timing of performing WPT between the PTU 100 and the PRU 200 will be described. FIG. 2 is a diagram illustrating the timing for WPT according to an embodiment of the present disclosure.

Referring to FIG. 2, at first timing T1, the communication transceiver 110 of the PTU 100 and the communication transceiver 210 of the PRU 200 perform legacy communication with each other through a suitable protocol, e.g., Zigbee, Wi-Fi, BLE, or ULP, thereby establish a communication link between the PTU 100 and the PRU 200, and exchange information necessary for WPT.

At second timing T2, the power controller 120 of the PTU 100 transmits the PTU beacon containing scheduling information to the PRU 200. The PTU beacon contains information about a slot allocated to the PRU 200 in a super frame (SF) including a plurality of DPSs.

Then, at third timing T3, the power controller 130 of the PRU 200 transmits the PRU beacon containing a continuous wave (CW) to the PTU 100. Thus, analyzing the CW of the PRU beacon, the power controller 120 of the PTU 100 can extract a phase difference between the PRU 200 and respective antennas of the power controller 120.

Then, at fourth timing T4, the power controller 120 of the PTU 100 transmits intensively power in a slot allocated to the corresponding PRU 200 in consideration of the extracted phase difference.

Next, frequency resources used for WPT according to an embodiment of the present disclosure will be described.

Figure 3:
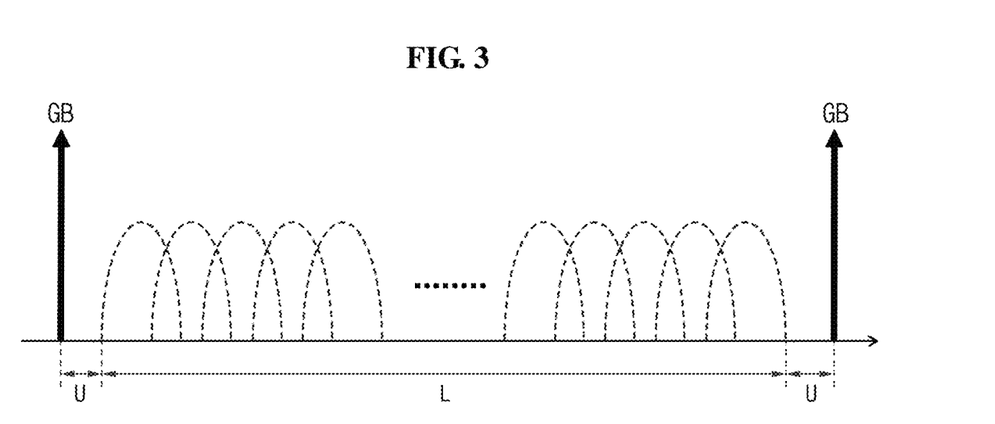
FIGS. 3 and 4 are diagrams illustrating a frequency band used for WPT according to an embodiment of the present disclosure.
Figure 4:
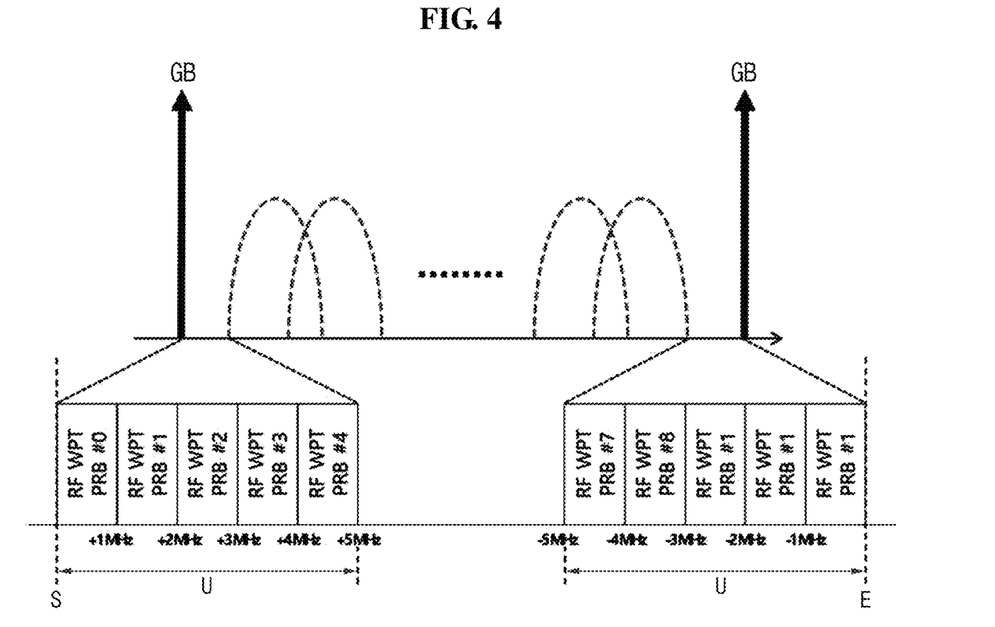

FIGS. 3 and 4 are diagrams illustrating a frequency band used for WPT according to an embodiment of the present disclosure.

Referring to FIG. 3, basically, an industrial scientific medical (ISM) band is used. The ISM band has a guard band (GB) to avoid interference between different legacy communications. That is, the GB is an empty frequency band used to prevent excess leakage of a radio signal from affecting another allocated band. All of the PTU beacon transmission, the PRU beacon transmission, and the power transmission are performed through frequency regions (U) each adjacent to the GB provided for the legacy communication (L) in the ISM band. That is, in the ISM band, the legacy communication (L) is performed between both adjacent frequency regions (U).

Referring to FIG. 4, frequencies for the adjacent frequency regions (U) are allocated in units of a resource block (i.e., RF WPT PRB) of 1 MHz. The reason is that the PTU beacon transmission, the PRU beacon transmission, and the power transmissions should occupy 1 MHz or less. For example, the adjacent frequency region (U) may occupy a predetermined band (e.g., 5 MHz) from each of the start frequency (S) and the end frequency (E) of the 2.4 or 5.8 GHz ISM band. In this case, the adjacent frequency regions (U) may be, for example, a 2.4-2.405 GHz band, a 2.495-2.5 GHz band, a 5.725-5.730 GHz band, and/or a 5.870-5.875 GHz band.

As such, when the resource blocks (RF WPT PRBs) each having bandwidth of 1 MHz are allocated to occupy a 5 MHz band from each of the start frequency (S) and the end frequency (E), the 2.4 or 5.8 GHz ISM band has ten resource blocks (PRBs).

Figure 5:
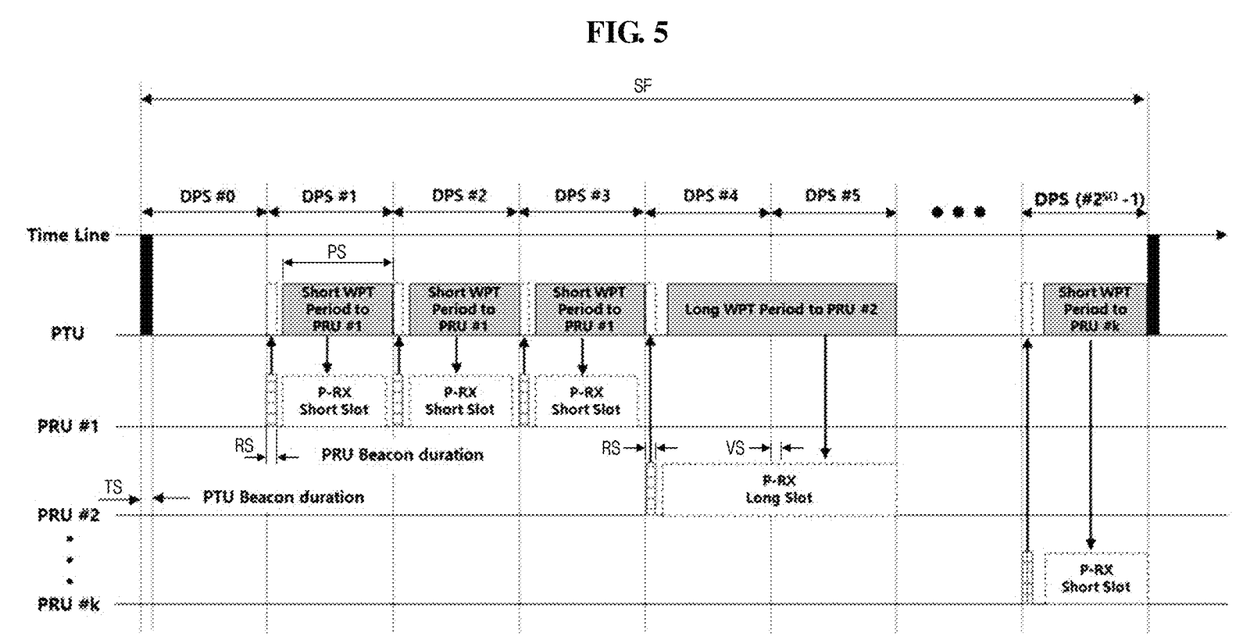
FIG. 5 is a diagram illustrating a frame structure used for WPT according to an embodiment of the present disclosure.

Next, a super frame which is a time resource used in WPT according to an embodiment of the present disclosure will be described. FIG. 5 is a diagram illustrating a frame structure used for WPT according to an embodiment of the present disclosure.

Referring to FIG. 5, the WPT is controlled using a super frame (SF) structure based on TDD communication. One SF has a plurality of slots, i.e., dedicated power slots (DPSs). One SF is defined as a signal period from transmission of one PTU beacon to transmission of the next PTU beacon. One super frame (SF) contains $2^{SO}$ DPSs according to a slot order (SO) value for defining the length of a field in the system. The SO value is defined in IE field part of Super Frame Specification of the PRU beacon, and may be specified in the range from 0 to 7. The first slot DPS #0 is necessarily used for the PTU. That is, the first slot DPS #0 is used for PTU beacon transmission. The next slots, that is, from the second slot DPS #1 to the $2^{SO}$th slot DPS #$2^{SO}$−1 are used for PRU beacon transmission and power transmission. In such slots, a sub-slot (RS) for the PRU beacon transmission and a sub-slot (PS) for the power transmission are defined. The PTU beacon is used for scheduling power transmission to a plurality of PRUs 200 according to priorities and used for synchronization of the plurality of PRUs 200 through variable DPS allocation.

The PRU beacon may be received in every DPS according to a request of the PRU. Alternatively, after the PRU beacon is received once, the DPS may be continuously allocated, and the sub-slot (RS) for the PRU beacon and an empty weight sub-slot (VS) may be used for WPT. The PRU 200 to which the corresponding slot (DPS) is allocated transmits the PRU beacon to the PTU 100. The PRU beacon contains a beacon part having the requirements of the PRU 200 for receiving power and a continuous wave (CW) behind the beacon part.

Figure 6:
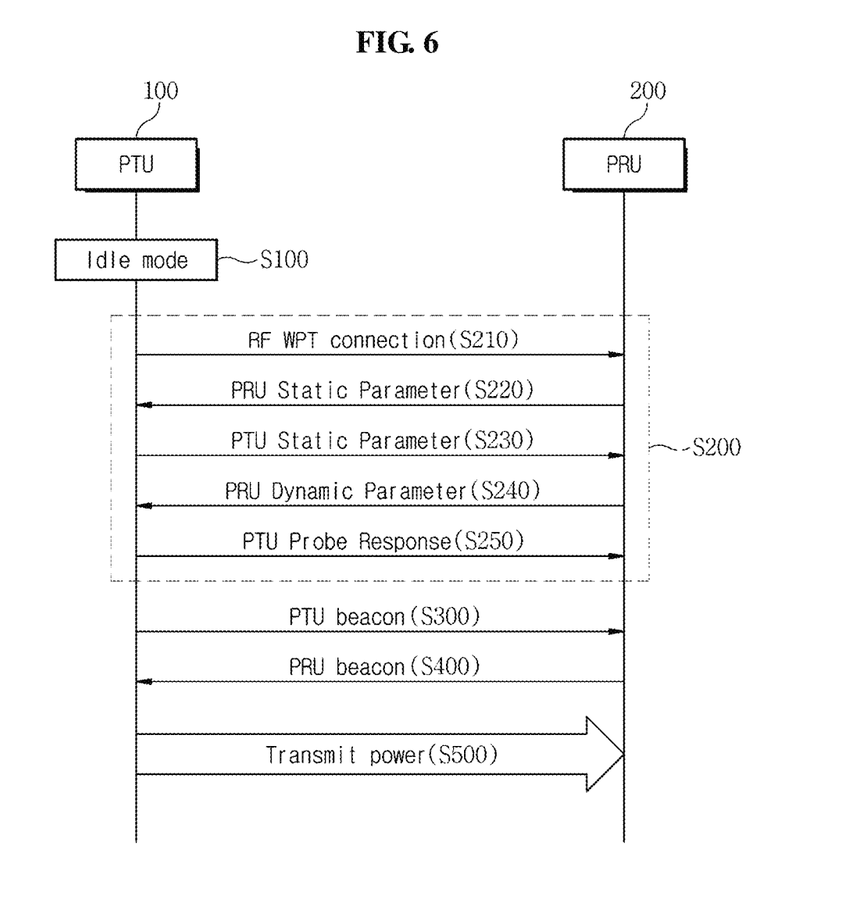
FIG. 6 is a flow diagram illustrating a method for TDD communication based WPT according to an embodiment of the present disclosure.

Hereinafter, a method for TDD communication based WPT according to an embodiment of the present disclosure will be described. FIG. 6 is a flow diagram illustrating a method for TDD communication based WPT according to an embodiment of the present disclosure.

Referring to FIG. 6, when power is supplied, the PTU 100 enters an idle mode at step S100.

In addition, when receiving an RF beamforming WPT start command, the PTU 100 is changed to a setting state at step S200. In the setting state, the PTU 100 establishes a communication link with at least one PRU 200 using legacy communication. At this time, the communication transceiver 110 of the PTU 100 and the communication transceiver 210 of the PRU 200 may use a suitable communication technique (e.g., Zigbee, Wi-Fi, BLE, ULP) available in the ISM band to establish a communication link with each other. When a plurality of PRUs 200 are connected through links, the PTU 100 determines the priorities of the PRUs 200 sequentially, that is, PRU #1, PRU #2, . . . , PRU #k (e.g., k=127). In addition, the communication transceiver 110 of the PTU 100 and the communication transceiver 210 of the PRU 200 exchange messages containing information necessary for WPT through the established communication link.

Specifically, when the communication link is established between the PTU 100 and the PRU 200 through the legacy communication, the communication transceiver 110 of the PTU 100 transmits an RF WPT Connection message to the PRU 200 at step S210 so as to declare the start of WPT. Upon receiving the RF WPT Connection message through the communication transceiver 210, the PRU 200 recognizes the start of WPT.

Then, at step S220, the PRU 200 transmits a PRU Static Parameter message to the PTU 100 through the communication transceiver 210, and thus the PTU 100 receives the PRU Static Parameter message through the communication transceiver 110. The PRU Static Parameter message contains static parameters indicating static characteristics of the PRU 200. The static parameters of the PRU 200 may include, for example, rectifier maximum power, rectifier maximum voltage, rectifier maximum constant voltage, and rectifier desired constant voltage.

Then, at step S230, the PTU 100 transmits a PTU Static Parameter message to the PRU 200 through the communication transceiver 110, and thus the PRU 200 receives the PTU Static Parameter message through the communication transceiver 210. The PTU Static Parameter message contains static parameters indicating static characteristics of the PTU 100. The static parameters of the PTU 100 may include, for example, PTU RF WPT transmit power, PTU support number of devices (which means the maximum number of PRUs to which the PTU 100 can allocate DPSs to be used for WPT), PTU TX output adjustment (which means the amount of radiation power of the PTU 100), tREP parameter option (which means a time difference between PRU beacon transmission and short-period WPT in TDD-based signal exchange), and PRU ID distribution (which means a unique ID of each PRU allocated by the PTU 100).

Then, at step S240, the PRU 200 transmits a PRU Dynamic Parameter message to the PTU 100 through the communication transceiver 210, and thus the PTU 100 receives the PRU Dynamic Parameter message through the communication transceiver 110. The PRU Dynamic Parameter message contains dynamic parameters indicating dynamic characteristics of the PRU 200. The dynamic parameters of the PRU 200 may include, for example, rectifier dynamic voltage, rectifier dynamic current, battery dynamic voltage, battery dynamic current, battery temperature, and rectifier desired minimum voltage.

Then, at step S250, the PTU 100 transmits a PTU Probe Response message indicating a final approval of WPT to the PRU 200 through the communication transceiver 110, and thus the PRU 200 receives the PTU Probe Response message through the communication transceiver 210. The PTU Probe Response message contains parameters for requirements and information necessary for WPT. The parameters contained in the PTU Probe Response message may include, for example, requested CW time (which means the duration time of a continuous wave (CW)), requested CW frequency (which means the frequency of CW), RF WPT priority order of designated PRU number (which means the WPT priority of a corresponding PRU 200), and current number of accessed PRUs (which means the total number of connected PRUs 200).

After the message exchange between the PTU 100 and the PRU 200 is completed as described above, the PTU 100 allocates slots (DPSs) for WPT to the plurality of PRUs 200 having priorities determined through scheduling. Then, at step S300, the PTU 100 transmits, to the PRU 200 through the power controller 120, the PTU beacon containing information on the slot (DPS) allocated to the corresponding PRU 200. Therefore, the PRU 200 receives the PTU beacon through the power controller 220. Then, the PRU 200 is synchronized on the super frame according to the allocated slot (DPS). The PTU beacon is transmitted in DPS #0 which is the first slot in the super frame including a plurality of slots (DPSs). Particularly, the PTU beacon is transmitted through the above-mentioned frequency region (U) adjacent to the guard band (GB) of the ISM band.

Then, at step S400, the PRU 200 transmits the PRU beacon in the allocated slot (at least one of the DPS #1 to #127) to the PTU 100 through the communication transceiver 210. Therefore, the PTU 100 receives the PRU beacon through the communication transceiver 110. The PRU beacon contains the CW of a specific frequency. Particularly, the PRU beacon is also transmitted through the adjacent frequency region (U).

After receiving the PRU beacon, the PTU 100 extracts a phase difference between the PRU 200 and each antennas of the PTU 100 by analyzing the CW of the PRU beacon. Then, based on the extracted phase difference, the PTU 100 transmits power to the PRU 200 through the power controller 120. Therefore, the PRU 200 can receive power during the allocated slot (DPS) through the power controller 220. This power is also transmitted through the adjacent frequency region (U).

Meanwhile, after the step S200, the PTU 100 continuously monitors the states of the plurality of PRUs 200 through the legacy communication. If any problem such as foreign object damage (FOD) or over charge occurs, the PTU 100 terminates and initializes a procedure.

The above-described methods according to various embodiments of the present disclosure may be implemented as instructions stored in a non-transitory computer-readable recording medium in a programming module form. When the instructions are executed by a processor, the processor may execute a function corresponding to the instructions. The non-transitory computer-readable recording medium may include magnetic media such as a hard disk, a floppy disk, and a magnetic tape, optical media such as a compact disc read only memory (CD-ROM) and a digital versatile disc (DVD), magneto-optical media such as a floptical disk, and hardware devices specially configured to store and perform a program instruction. In addition, the program instructions may include high class language codes, which can be executed in a computer by using an interpreter, as well as machine codes made by a compiler. The hardware devices described above may be configured to operate as one or more software modules to perform the operations of the various embodiments, and vice versa.

While the present disclosure has been particularly shown and described with reference to an exemplary embodiment thereof, it will be understood by those skilled in the art that various changes in form and details may be made therein without departing from the scope of the present disclosure as defined by the appended claims.

What is claimed is:

1. A power transmitting unit (PTU) for wireless power transmission (WPT), the PTU comprising:
a communication transceiver connecting a communication link with at least one power receiving unit (PRU) through legacy communication and exchanging parameters necessary for the WPT through the connected communication link; and
a power controller configured to:
transmit, to the PRU, a PTU beacon containing information about a dedicated power slot (DPS) allocated to the PRU in a super frame including a plurality of DPSs,
receive a PRU beacon from the PRU,
extract a phase difference between a plurality of antennas by analyzing a continuous wave (CW) of the PRU beacon, and
transmit power to the PRU in the allocated DPS in consideration of the phase difference,
wherein transmitting the PTU beacon, receiving the PRU beacon, and transmitting the power are performed through a frequency region adjacent to a guard band in an industrial scientific medical (ISM) band, and
wherein the adjacent frequency region occupies a predetermined band from each of a start frequency and an end frequency of the ISM band.

2. The PTU of claim 1, wherein the super frame is defined as a signal period from transmission of one PTU beacon to transmission of a next PTU beacon,
wherein the super frame contains $2^{so}$ DPSs according to a slot order (SO) value for defining a length of a field in a system,
wherein a first DPS of $2^{so}$ DPSs is used for PTU beacon transmission, and
wherein a second DPS to a $2^{so}$th DPS of $2^{so}$ DPSs are used for PRU beacon transmission and power transmission.

3. A power receiving unit (PRU) for wireless power transmission (WPT), the PRU comprising:
a communication transceiver connecting a communication link with a power transmitting unit (PTU) through legacy communication and exchanging parameters necessary for the WPT through the connected communication link; and
a power controller configured to:
receive, from the PTU, a PTU beacon containing information about a dedicated power slot (DPS) allocated to the PRU in a super frame including a plurality of DPSs,
transmit a PRU beacon to the PTU in the allocated DPS, and
receive power from the PTU in the allocated DPS,
wherein receiving the PTU beacon, transmitting the PRU beacon, and receiving the power are performed through a frequency region adjacent to a guard band in an industrial scientific medical (ISM) band, and wherein the adjacent frequency region occupies a predetermined band from each of a start frequency and an end frequency of the ISM band.

4. The PRU of claim 3, wherein the super frame is defined as a signal period from transmission of one PTU beacon to transmission of a next PTU beacon, wherein the super frame contains $2^{so}$ DPSs according to a slot order (SO) value for defining a length of a field in a system, wherein a first DPS of $2^{so}$ DPSs is used for PTU beacon transmission, and wherein a second DPS to a $2^{SO}$th DPS of $2^{so}$ DPSs are used for PRU beacon transmission and power transmission.

5. A method for controlling wireless power transmission (WPT) at a power transmitting unit (PTU), the method comprising:

at a communication transceiver, connecting a communication link with at least one power receiving unit (PRU) through legacy communication;

at the communication transceiver, exchanging parameters necessary for the WPT through the connected communication link;

at a power controller, transmitting, to the PRU, a PTU beacon containing information about a dedicated power slot (DPS) allocated to the PRU in a super frame including a plurality of DPSs;

at the power controller, receiving a PRU beacon from the PRU;

at the power controller, extracting a phase difference between a plurality of antennas by analyzing a continuous wave (CW) of the PRU beacon; and at the power controller, transmitting power to the PRU in the allocated DPS in consideration of the phase difference, wherein transmitting the PTU beacon, receiving the PRU beacon, and transmitting the power are performed through a frequency region adjacent to a guard band in an industrial scientific medical (ISM) band, and wherein the adjacent frequency region occupies a predetermined band from each of a start frequency and an end frequency of the ISM band.

6. The method of claim 5, wherein the super frame is defined as a signal period from transmission of one PTU beacon to transmission of a next PTU beacon, wherein the super frame contains $2^{so}$ DPSs according to a slot order (SO) value for defining a length of a field in a system, wherein a first DPS of $2^{so}$ DPSs is used for PTU beacon transmission, and wherein a second DPS to a $2^{SO}$th DPS of $2^{so}$ DPSs are used for PRU beacon transmission and power transmission.

7. A method for controlling wireless power transmission (WPT) at a power receiving unit (PRU), the method comprising:

at a communication transceiver, connecting a communication link with a power transmitting unit (PTU) through legacy communication;

at the communication transceiver, exchanging parameters necessary for the WPT through the connected communication link;

at a power controller, receiving, from the PTU, a PTU beacon containing information about a dedicated power slot (DPS) allocated to the PRU in a super frame including a plurality of DPSs;

at the power controller, transmitting a PRU beacon to the PTU in the allocated DPS; and at the power controller, receiving power from the PTU in the allocated DPS, wherein receiving the PTU beacon, transmitting the PRU beacon, and receiving the power are performed through a frequency region adjacent to a guard band in an industrial scientific medical (ISM) band, and wherein the adjacent frequency region occupies a predetermined band from each of a start frequency and an end frequency of the ISM band.

8. The method of claim 7, wherein the super frame is defined as a signal period from transmission of one PTU beacon to transmission of a next PTU beacon, wherein the super frame contains $2^{so}$ DPSs according to a slot order (SO) value for defining a length of a field in a system, wherein a first DPS of $2^{so}$ DPSs is used for PTU beacon transmission, and wherein a second DPS to a $2^{SO}$th DPS of $2^{so}$ DPSs are used for PRU beacon transmission and power transmission.

* * * * *